United States Patent Office 3,435,669
Patented Apr. 1, 1969

3,435,669
TENSIOMETRIC APPARATUS FOR DIRECT DETERMINATION OF THE MAGNITUDES AND DIRECTIONS OF PRINCIPAL STRESSES
Ivan Atanassov Slavov, Kiril Dimitrov Daskalov, Petar Levtchev Ganev, Stefan Petrov Mandjakov, and Petko Ivanov Barzakov, Sofia, Bulgaria, assignors to Mashinno-Elecktiotechnitcheski Institut, Sofia, Bulgaria
Filed Apr. 21, 1966, Ser. No. 544,296
Int. Cl. G01n 3/00
U.S. Cl. 73—88.5    5 Claims

ABSTRACT OF THE DISCLOSURE

Apparatus for measuring the magnitudes and directions of principal stresses in the plane of a work surface stressed by static or dynamic loading, and at a point in the work surface includes means converting strain gauge inputs, respective to different strain directions, into sinusoidal amplitude-modulated signals with suppressed carrier frequency. A series of analog computer circuit units are connected to outputs of the converter means and include analog computer units certain of which form linear combinations of the type $a_1x+b_1y$, $c_1x-d_1y$, $x^2+y^2$ and the function arctg $x/y$. The output signals are in the form of $\Delta_{\min.}(t)$, $\Delta_{\max.}(t)$ and $\alpha_0(t)$.

Background of the invention

This invention relates to the determination of the magnitude and direction of principal stresses at a point in a working surface and, more particularly, to a novel apparatus for the direct and uninterrupted determination, with respect to time, of the magnitude and direction of main stresses, originating at a point in a working surface, under static and arbitrary dynamic loadings.

The magnitude and direction of the principal stresses hitherto have been determined solely by mathematical calculations on the basis of experimentally determined strains $E_1$, $E_2$, $E_3$ and $E_4$ in selected directions with respect to a pattern known as a "tensiometric rosette." The principal formulae used in calculating the magnitude and direction of the principal stresses with respect to the direction of the tensiometer measuring the strain $E_1$, using a standard rosette, are the following:

$$\delta_{\min,\ \max} = K_1 f_1(E_1 \ldots E_4)$$
$$\pm K_2 \sqrt{f_2{}^2(E_1 \ldots E_4) + f_3{}^2(E_1 \ldots E_4)} \quad (a)$$

$$\alpha = \frac{1}{2} \operatorname{arctg} \frac{f_3(E_1 \ldots E_4)}{f_2(E_1 \ldots E_4)} \quad (b)$$

wherein: $f_1(E_1 \ldots E_4)$, $f_2(E_1 \ldots E_4)$, and $f_4(E_1 \ldots E_4)$ are linear combinations from the strains, and $K_1$ and $K_2$ are constants of the object investigated. The type of the above combinations depends on the type of the rosette used. Table 1 shows the combinations for three types of standard rosettes: rectangular, delta, and T-delta.

TABLE 1

|  | Rectangular | Delta | T-delta |
|---|---|---|---|
| $f_1(E_1 \ldots E_4)$ | $\dfrac{E_1-E_3}{2}$ | $\dfrac{E_1+E_2+E_3}{3}$ | $\dfrac{E_1+E_4}{2}$ |
| $f_2(E_1 \ldots E_4)$ | $\dfrac{E_1-E_3}{2}$ | $\dfrac{3E_1-(E_1+E_2+E_3)}{3}$ | $\dfrac{E_1-E_4}{2}$ |
| $f_3(E_1 \ldots E_4)$ | $\dfrac{2E_2-(E_1+E_3)}{2}$ | $\dfrac{E_2-E_3}{\sqrt{3}}$ | $\dfrac{E_2-E_3}{\sqrt{3}}$ |

In the case of dynamic forces exerted upon an object, the strains $E_1$, $E_2$, $E_3$ and $E_4$ for each particular instant are determined from the combined synchronized recording of these strains, as shown in FIG. 1 of the drawings. FIG. 1 demonstrates the imperfection of this method, which is that the discrete or respective readings at respective instants of time cannot guarantee recording of the extreme values of the main stresses, as these extreme values frequently differ from the neighboring values unless the measurement points are at infinitely small distances from each other. The practical limit of reduction of these distances, by increasing the number of readings per unit of time, is limited by the corresponding increase in the work of calculation to a volume which is impractical.

An object of the present invention is to provide an apparatus for automatically determining the magnitude and direction of main stresses in the form of continuous electric signals derived from tensiometer signals.

Another object of the invention is to provide such an apparatus in which the continuous electric signals are recorded or processed in other ways.

A further object of the invention is to provide an apparatus for determining the magnitude and direction of stresses originating at a point in a working surface, and in which the measured strains in a tensiometric rosette are converted into continuous electrical signals proportional to the principal stresses and to the angle between their directions and the direction of measurement of one of the strains, the latter being selected as a base.

For an understanding of the principles of the invention, reference is made to the following description of typical embodiments thereof as illustrated in the accompanying drawings.

Figure 1:
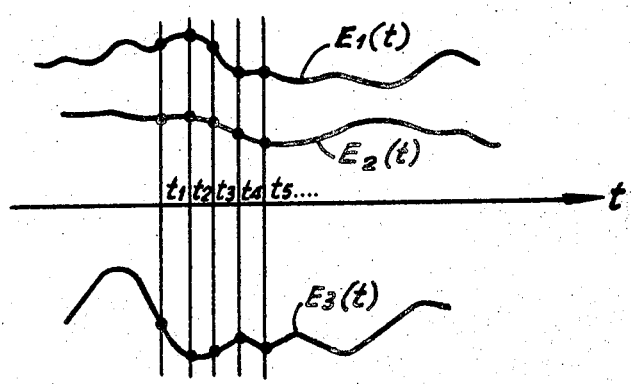
FIG. 1 is a graphical illustration of the prior art method of determining the magnitude of principal stresses originating at a point in a working surface.

As stated, in the prior art arrangement shown in FIG. 1, the stresses are measured at times $t_1 \ldots t_5 \ldots$ separated at small intervals from each other, and this determines the magnitude of the stresses E as a function of time $(t)$. However, and as also stated, the method graphically illustrated in FIG. 1, cannot assure attaining of the reading of the maximum values of the main stresses as these maximum values frequently differ substantially from values immediately adjacent thereto timewise, unless the time intervals are impractically small.

Figure 2:
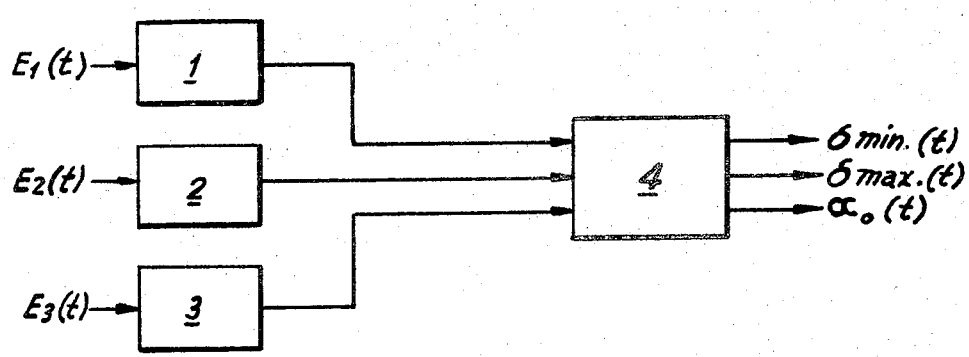
FIG. 2 is a schematic block diagram of stress measuring apparatus embodying the principles of the present invention.

Referring to FIG. 2, in accordance with the invention, blocks 1, 2, and 3 are provided having inputs to which may be fed the outputs of tensiometric amplifiers of any type. Also, electric tensiometers may be directly connected to the inputs of blocks 1, 2 and 3. The outputs of blocks 1, 2 and 3 are commonly connected to an electronic device 4 which processes the output signals of blocks, 1, 2 and 3 in accordance with the Formulae (a) and (b) given above. As particularly illustrated in FIG. 2, the signals $E_1(t)$, $E_2(t)$ and $E_3(t)$ constitute the inputs of the blocks 1, 2 and 3 whose outputs are to be applied to the device 4 for processing to develop, at the outputs of device 4, $\delta_{\max.}(t)$, $\delta_{\min.}(t)$ and $\alpha_0(t)$.

For the purpose of developing these output signals, electronic device 4 includes balanced modulators operating in synchronism and effective to convert the output signals of blocks 1, 2 and 3 into sinusoidal amplitude-modulated signals with suppressed carrier frequency. The electronic device thus operates with the A.M. or A.C. signals. Following the modulators, there are analog computer circuits or units whose connections are interchanged in accordance with the type of tensiometric rosette or pattern used.

Figure 3A:
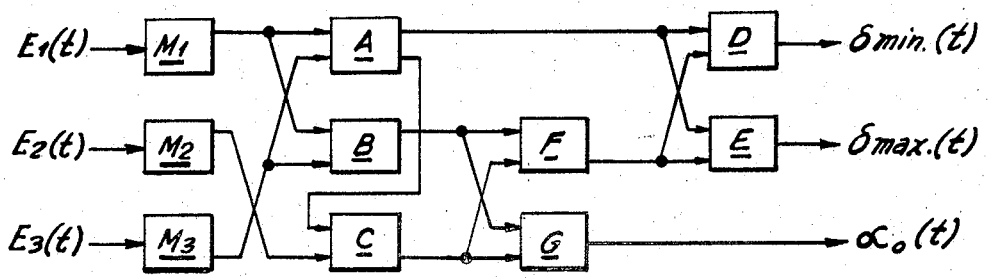
FIG. 3a is a schematic block diagram illustrating the connection of apparatus components for use with a rectangular rosette.
Figure 3B:
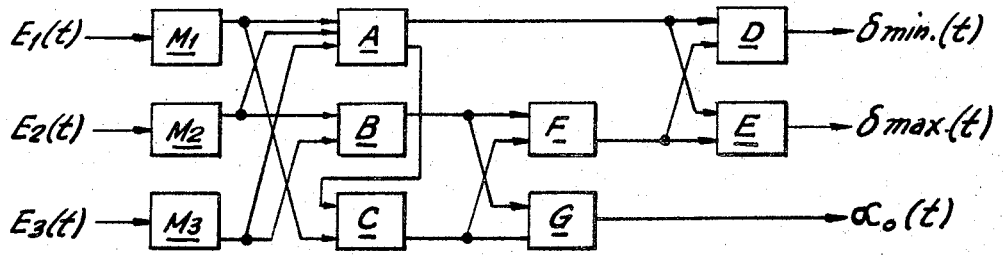
FIG. 3b is a view similar to FIG. 3a but illustrating the connections as changed for use with a delta rosette.
Figure 3C:
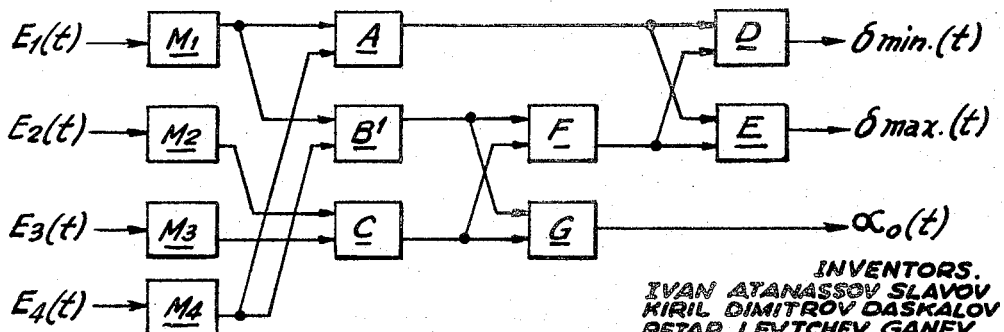
FIG. 3c is a schematic block diagram similar to the block diagrams of FIGS. 3a and 3b, but illustrating the connections as used with a T-delta rosette.

The details of the electronic device 4 are shown in FIGS. 3a, 3b and 3c. In each of these figures, there are three modulators $M_1$, $M_2$ and $M_3$ receiving, respectively, the signals $E_1(t)$, $E_2(t)$ and $E_3(t)$. In addition, the arrangement shown in FIG. 3 includes a fourth modulator $M_4$ receiving the input signal $E_4(t)$. The invention arrangement also includes analog computer units A, B, B', C, D, E, F and G. The three figures, 3a, 3b and 3c, illustrate the respective connections between the modulators and the analog computer units upon using a rectangular rosette, a delta rosette, and a T-delta rosette, respectively.

The analog computer units A, B, B', C, D and E shown in FIGS. 3a, 3b and 3c, form linear combinations from the input signals applied thereto, as follows:

Units A, B, and E form linear combinations of the type $a_i x + b_i y$;

Units B', C, and D form linear combinations of the type $c_i x - d_i y$; and

Unit F forms a mean-quadratic value from the signals fed at its input, which mean-quadratic value is of the type $$\sqrt{x^2 + y^2}$$

Unit G forms the function arctg $x/y$ from the signals $x$ and $y$ fed at its input.

The coefficients $a_i$, $b_i$, $c_i$ and $d_i$ of the above linear combinations can be changed by varying the dampening of the analog computer units or by changing the connections between the latter, in such a manner as to obtain, at the outputs of the block diagram shown in FIGS. 3a, 3b or 3c, signals corresponding to those in Table 1 and as shown in Table 2.

When a rectangular rosette is used as the stress pattern, the connections are arranged as shown in FIG. 3a. As illustrated therein, the units A and B form linear combinations between the signals corresponding to strains $E_1$ and $E_3$. The unit C forms a linear combination between signals corresponding to strains $E_1$, $E_2$ and $E_3$. Unit E forms a mean-quadratic value from the linear combinations derived from units B and C. The units E and D form linear combinations between the mean-quadratic value of the combination obtained from unit F and the linear combination obtained at the output of unit A. The unit G forms a signal proportional to the arctan of the ratio between the linear combination derived by unit B and the linear combination derived at the output of unit C.

When T-delta rosettes are used as the stress pattern, analogous operations are performed by duly changing the connections between the analog computer units as illustrated in FIG. 3b and FIG. 3c, respectively. FIG. 3b shows the connection arrangement with a delta rosette and FIG. 3c shows a connection arrangement with a T-delta rosette. Thus, in FIG. 3b, the outputs of all three modulators $M_1$, $M_2$ and $M_3$ are applied to analog computer unit A the outputs of modulators $M_2$ and $M_3$ are applied to the input of analog computer unit B, and the output of modulator $M_1$ and the output of analog computer unit A are applied to the input of analog computer unit C.

Correspondingly, in FIG. 3c, the outputs of modulators $M_1$ and $M_4$ are applied to analog computer unit A, the outputs of modulators $M_1$ and $M_4$ are also applied to analog computer unit B', and the outputs of modulators $M_2$ and $M_3$ are applied to analog computer unit C.

The results attained are illustrated in Table 2, as follows:

When delta or T-delta rosettes are used, analogical operations are performed by duly changing the connections among the same analog computer units.

TABLE 2

|    | Rectangular | Delta | T-delta |
|----|---|---|---|
| A  | $-f_1(E_1 \ldots E_4)$ | $-f_1(E_1 \ldots E_4)$ | $-f_1(E_1 \ldots E_4)$ |
| B  | $f_2(E_1 \ldots E_4)$ | $f_3(E_1 \ldots E_4)$ | $f_2(E_1 \ldots E_4)$ |
| B' |  |  | $-f_3(E_1 \ldots E_4)$ |
| C  | $-f_3(E_1 \ldots E_4)$ | $-f_2(E_1 \ldots E_4)$ |  |
| F  | $\sqrt{f_{22}(E_1 \ldots E_4) + f_{23}(E_1 \ldots E_4)}$ | | |
| D  | $\delta_{\min}$ | | |
| E  | $\delta_{\max}$ | | |
| G  | $\alpha 0$ | | |

While specific embodiments of the invention have been shown and described in detail to illustrate the application of the principles of the invention, it will be understood that the invention may be embodied otherwise without departing from such principles.

What is claimed is:

1. Apparatus for measuring the magnitudes and the directions of principal stresses at a point in the plane of a work surface stressed by static or dynamic loading, comprising, in combination, plural sensors each detecting variations in the strain along respective different directions at such point, and each providing an electrical output signal corresponding to the respective measured strain; respective means amplifying the output signals of said sensors; respective balanced modulator means receiving the output signal corresponding to respective measured strain and being additionally fed a carrier signal of substantially higher frequency than said strain signal, said balanced modulator means converting the output signals of the respective amplifying means into sinusoidal amplitude-modulated signals with suppressed carrier frequency; and plural analog computer units connected to the outputs of said balanced modulators and effective to combine the sinusoidal amplitude-modulated signals to provide continuous output signals proportional to the magnitudes of the principal stresses and to the angles between their directions and one direction of strain measurement used as a reference base.

2. Apparatus as claimed in claim 1, including at least three sensors and in which said analog computer units include first, second and third analog computer units each having an input connected to the output of at least one of said balanced modulators and each providing a respective linear combination of said sinusoidal amplitude-modulated signals with suppressed carrier frequency, at least said first analog computer unit adding the signals at its inputs to provide a linear combination thereof of the form $a_1 x + b_1 y$, and at least said third analog computer unit subtracting the signals at its inputs to provide a linear combination thereof of the form $c_1 x - d_1 y$; fourth and fifth analog computer units each having one input connected to the output of said second analog computer unit and another input connected to the output of said third analog computer unit, said fourth unit combining the signals at its input to provide, at its output, a mean-quadratic function, of the form $\sqrt{x^2 + y^2}$, of the linear combinations formed by said second and third units, and said fifth unit forming, from the signals $x$ and $y$ at its input, the function arctg $x/y$ at its output; and sixth and seventh analog computer units each having one input connected to the output of said first unit and another input connected to the output of said fourth unit, said sixth unit combining the signals at its inputs to provide, at its output, a signal proportional to the instantaneous magnitude of the minimum principal stress, and said seventh unit combining the signals at its inputs to provide, at its output, a signal proportional to the instantaneous magnitude of the maximum principal stress.

3. Apparatus as claimed in claim 2, wherein there are first, second and third balanced modulators and, when said sensors are arranged in a rectangular pattern, the inputs of said first and second analog computer units are connected to the outputs of said first and third balanced modulators; said first and second analog computer units adding the signals at their respective inputs to provide respective linear combinations, of said sinusoidal amplitude-modulated signals with suppressed carrier frequency, of the form $a_1x + b_1y$; the input of said third analog computer unit being connected to the output of said second balanced modulator and to the output of said first unit; said third analog computer unit subtracting the signals at its inputs to provide, at its output, a linear combination, of the sinusoidal amplitude-modulated signals with suppressed carrier frequency, of the form $c_1x - d_1y$; said fifth unit combining the signals at its inputs to provide, at its output, a means-quadratic function, of the form $\sqrt{x^2+y^2}$, of the linear combinations formed by said second and third units; said fourth and fifth analog computer units combining the signals, at their respective inputs, to provide respective linear combinations of the mean-quadratic values at the output of said sixth unit and the linear combination at the output of said first unit.

4. Apparatus, as claimed in claim 2, in which said balanced modulators include first, second and third balanced modulators and, when said sensors are arranged in a delta pattern, the input of said first analog computer unit is connected to the outputs of all three balanced modulators; the input of said second analog computer unit being connected to said second and third balanced modulators; the input of said third analog computer unit being connected to said first balanced modulator and to the output of said first unit; said first analog computer unit adding the signals at its inputs to provide, at its output, a linear combination, of the form $a_1x + b_1y$, of the sinusoidal amplitude-modulated signals with suppressed carrier frequency corresponding to the instantaneous magnitudes of the strains in first, second and third measuring directions; said third analog computer unit subtracting the signals at its inputs to provide, at its output, a linear combination thereof, of the form $c_1x + d_1y$, and corresponding respectively to the instantaneous magnitudes of the strains in first, second and third measuring directions; said second unit adding the signals at its input to provide, at its output, a linear combination thereof of the form $a_1x + b_1y$, of the sinsuoidal amplitude-modulated signals with suppressed carrier frequency corresponding respectively to the instantaneous magnitudes of the strains in the second and third measuring directions.

5. Apparatus, as claimed in claim 2, wherein said balanced modulators comprise first, second, third, and fourth balanced modulators and said sensors are arranged in a T-delta pattern; the inputs of said first and second analog computer units being connected to the outputs of said first and fourth balanced modulators; said first analog computer unit adding the signals at its inputs to provide, at its output, a linear combination thereof of the form $a_1x + b_1y$, of the sinusoidal amplitude-modulated signals with suppressed carrier frequency corresponding respectively to the instantaneous magnitudes of the strains in first and fourth measuring directions; said second analog computer unit subtracting the signals at its inputs to provide, at its output, a linear combination thereof of the form $c_1x - d_1y$, of the sinusoidal amplitude-modulated signals with suppressed carrier frequency corresponding respectively to the instantaneous magnitudes of the strains in first and fourth measuring directions; the input of said third analog computer unit being connected to the outputs of said second and third balanced modulators, and said third unit subtracting the signals at its inputs to provide, at its output, a linear combination thereof of the form $c_1x - d_1y$, of the sinusoidal amplitude-modulated signals with suppressed carrier frequency corresponding respectively to the instantaneous magnitudes of the strains in the second and third measuring directions.

References Cited

Grover, H. S.: Experimental Stress Analysis, vol. 1, No. 1, published 1943, pp. 110–113 and 115.

Hoskins, E. E. et. al.: Experimental Stress Analysis, vol. II, No. 1, published 1944, pp. 67–77.

Meier, J. H.: Experimental Stress Analysis, vol. II, No. 1, published 1944, pp. 78–92.

Mehaffey, N. R.: Experimental Stress Analysis, vol. II, No. 1, published 1944, pp. 93 and 95–101.

Manson, S. S.: Experimental Stress Analysis, vol. II, No. 1, published 1944, pp. 102–105.

RICHARD C. QUEISSER, *Primary Examiner.*

U.S. Cl. X.R.

235—184